Aug. 30, 1938. M. O. SNEDIKER 2,128,541
CHART CLAMP
Filed July 29, 1935
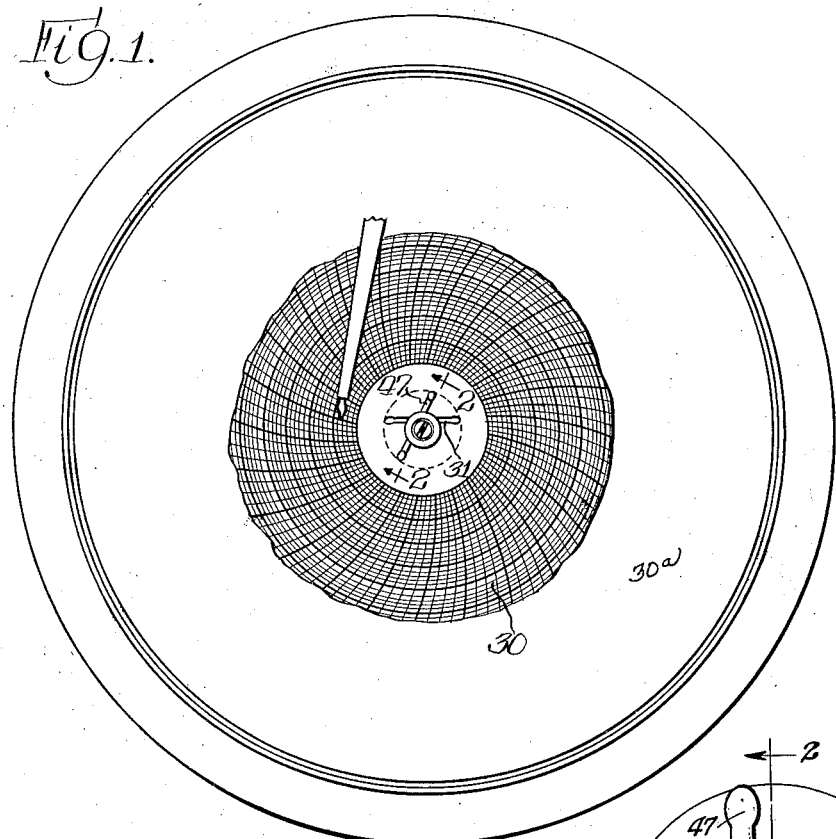
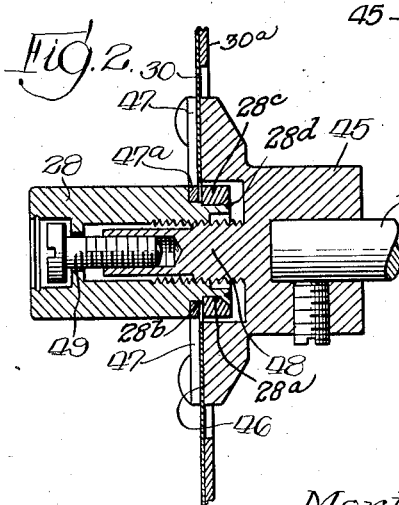
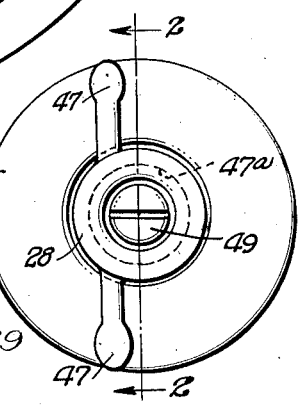
Inventor:-
Morton O. Snediker,
By Murray Murray Attys.

Patented Aug. 30, 1938

2,128,541

UNITED STATES PATENT OFFICE 2,128,541

CHART CLAMP

Morton O. Snediker, Chicago, Ill., assignor to The Powers Regulator Company, Chicago, Ill., a corporation of Illinois Application July 29, 1935, Serial No. 33,649

2 Claims. (Cl. 234—75)

My invention relates to a chart clamp and particularly to a clamp for the circular charts used in connection with recording instruments, such as thermometers.

An object of my invention is to provide a construction in which the clamping elements are inseparable from the instrument and in which the chart may be easily and quickly applied and removed. In the device of my invention I provide a clamping surface that may or may not be connected to a shaft rotated by timing mechanism, a nut inseparable from operating relation and a ring freely rotatable and inseparable from the nut, the ring having a pair of arms that constitute the clamping elements for the chart. A chart for use in this connection is provided with perforations that register with the nut and the arms in one position of the arms.

The invention will be more readily understood by reference to the accompanying drawing; in which, Fig. 1 is a face view of a recording thermometer showing a portion of a chart clamped in position by my novel mechanism, Fig. 2 is an enlarged sectional elevation on the line 2—2 of Figs. 1 and 3, and Fig. 3 is an enlarged face view of the clamp with the chart omitted.

A chart, such as contemplated, is indicated at 30, the chart having a round aperture to register with the nut and a lateral aperture 31 corresponding to the shape and disposition of the clamp arms.

The novel chart clamping device, shown in detail in Fig. 2, consists of a body 45 held by a set screw to the shaft 29, the body having a face 46 against which the chart is clamped. A ring 47a, carrying a pair of eccentric arms 47, is seated in a groove in the nut 28, the ring and arms being freely rotatable on the nut. The nut has an axial threaded recess that engages a threaded stud 48 projecting from the body 45, and a screw 49 also engages the stud, the head of the screw acting as a limit stop for the nut 28.

The groove in the nut 28 is formed by providing stepped, reduced portions 28a—28b. The ring 47 occupies the reduced portion 28b and a retaining ring 28c occupies the reduced portion 28a. The metal of the nut 28 is upset as at 28d in order to permanently hold the retaining ring 28c in place. Thus the ring 47a and its attached arms 47 are freely rotatable in the groove formed as described and the nut may be rotated on the threaded stud 48 to advance and retract the nut, ring and arms toward and away from the supporting face 46 for the chart. The outward motion of the nut is limited by the screw 49, which prevents the nut from being disengaged and lost.

The cut-out 31 in the chart may be of the same size or larger than the arms 47, the thin paper of the chart readily admitting the arms when the chart is to be placed in position.

The chart 30 which lies against the metal support 30a will be punched as indicated at 31 in Fig. 1; that is, so as to register with the arms 47 in only one position within the complete rotation of the chart. This is the reason why the arms are arranged eccentrically; if they were diametrically opposite and the chart was correspondingly punched then they would register every 180° of rotation. The latter construction is not objectionable in many cases and its use is contemplated.

However, the chart being punched as shown, it may be inserted over the nut and arms without distorting the paper and thereafter the nut may be turned to clamp the arms against the paper. The user need only be sure that the arms are not in register with the punched opening when the clamping action takes place. A construction such as described insures that the clamping nut will not be dropped and lost when changing charts.

I claim:

1. In combination, a shaft and means including a body carried thereby providing a surface against which a chart may be clamped, a nut screw-connected to the body and free to rotate toward and from the chart-clamping position, means preventing normal separation of the nut from the body, and an arm freely rotatable on the nut and adapted, with the nut, to clamp the chart against said body, said chart having an opening substantially registering with said nut and arm.

2. The combination of a shaft and means including a body carried thereby against which a chart may be clamped, a nut screw-connected to the body and free to rotate toward and from chart clamping position, means preventing normal separation of the nut from the body, and an arm freely rotatable on the nut and adapted, with the nut, to clamp the chart against said body, said arm being eccentric to said nut, said chart having an opening substantially registering with said nut and arm in only one angular position of said arm.

MORTON O. SNEDIKER.